Nov. 15, 1966  L. A. KURTIS  3,284,945
BAIT HOLDER
Filed Nov. 9, 1964
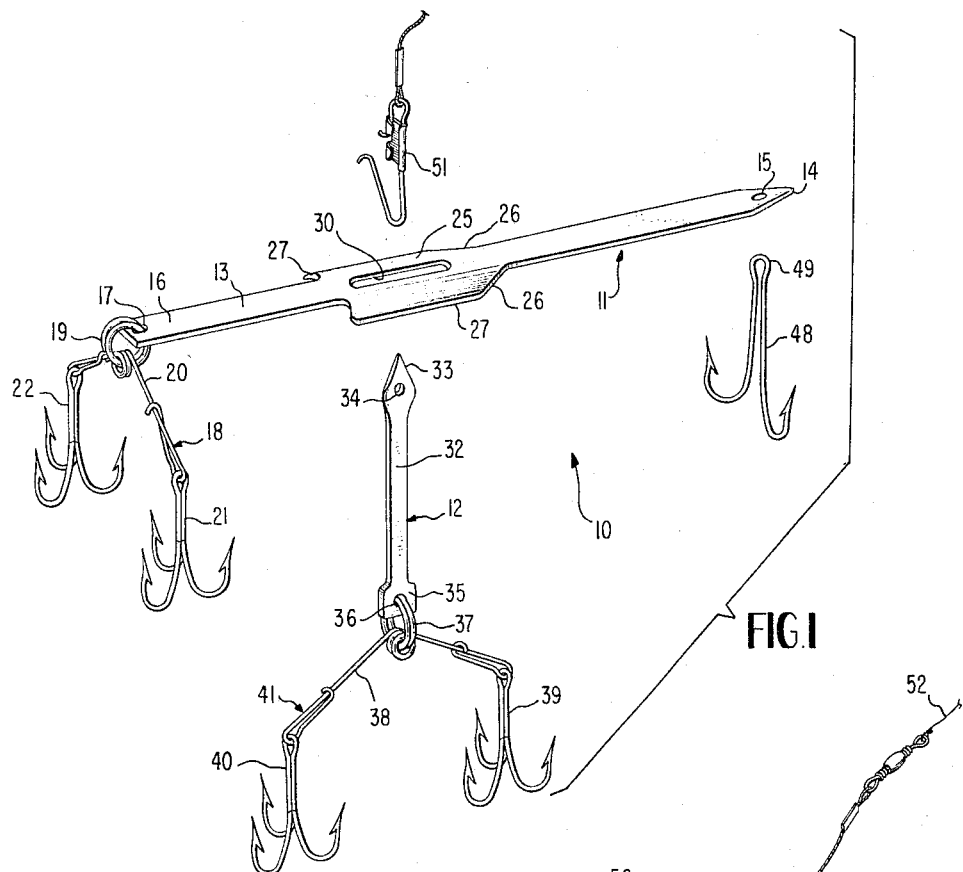
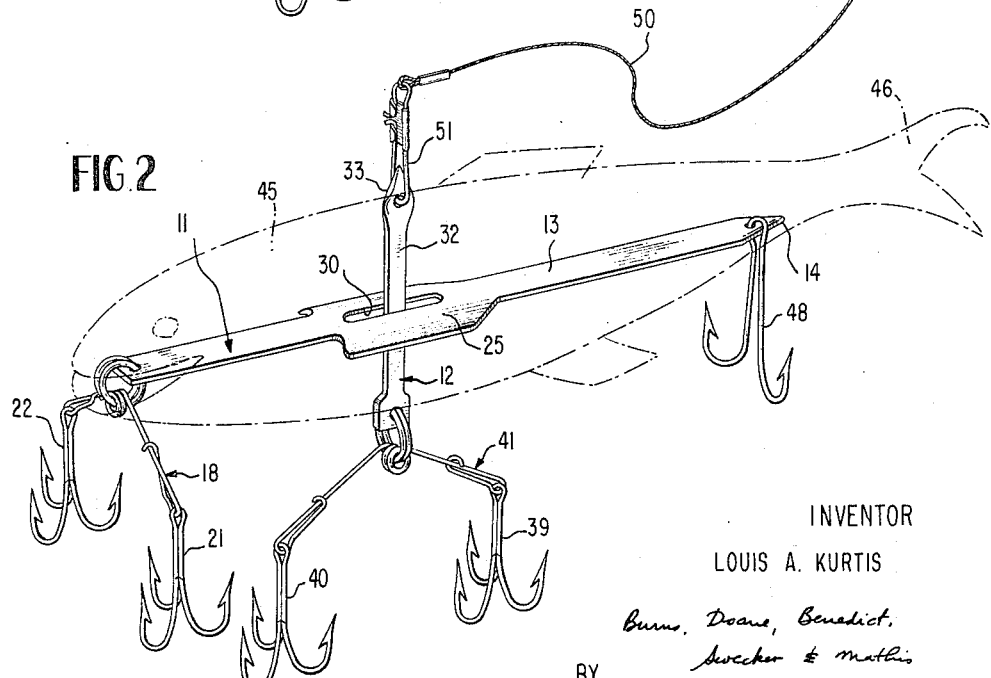
INVENTOR
LOUIS A. KURTIS
BY Burns, Doane, Benedict,
Swecker & Mathis
ATTORNEYS

United States Patent Office 3,284,945
Patented Nov. 15, 1966

3,284,945
BAIT HOLDER
Louis A. Kurtis, 8573 Pinehurst, Detroit, Mich.
Filed Nov. 9, 1964, Ser. No. 409,764
2 Claims. (Cl. 43—44.2)

This invention relates to a novel fishhook and bait holder device, and to a novel method of using real fish or bait.

Smelt is known to many fishermen as an effective bait, particularly for northern pike, lake trout, whitefish, and other large game fish. Some jurisdictions, however, prohibit the use of live smelt, and other live fish, as bait. I have discovered a fishhook and bait holder device and a method of using smelt and other fish as a bait, which method has proved to be extremely effective and which does not violate house game laws prohibiting the use of certain live fish as bait.

One object of this invention is to provide a fishhook and bait device which is simple in construction, easy to manipulate, and which overcomes certain drawbacks encountered with previous devices.

Another object of this invention is to provide a novel method of using real fish as bait.

The fishhook and bait device of this invention is made into two separate main units. One unit is a long, rigid pin structure having a point at one end and a series of fishhooks at the other end. The second unit is a shorter rigid pin structure having a point at one end and a series of hooks at the other. The first pin has a hole therethrough at the pointed end and an elongated slot at the mid portion. The second pin is adapted to be fitted through the elongated slot of the first pin. The second pin has a hole therethrough at the pointed end for receiving a leader. A fishhook is inserted through the hole at the pointed end of the first pin. The method of this invention includes the freezing of smelt or other bait fish and thereafter using the frozen fish as bait.

The invention is illustrated in the accompanying drawings in which:

FIGURE 1 is a perspective exploded view of the fishhook and bait holder device of this invention; and FIGURE 2 is a perspective view of the device assembled and showing its relationship to a fish used as bait.

The fishhook and bait holder 10 of this invention primarily includes two main units 11 and 12 as illustrated in the drawings. The first unit 11 comprises an elongated, generally flat, rigid pin structure 13. The front end 14 is pointed and has a hole 15 extending therethrough. The rear end 16 has a hole 17 therethrough receiving a fishhook assembly 18 which comprises a wire ring 19 extending loosely through the hole 17 and receiving in wrapped-around relationship a hanger wire 20 which extends to opposite sides of the pin 13. Triple-pointed fishhooks 21 and 22 hang loosely from opposite ends of the hanger wire 20.

The mid portion of the pin 13 has a widened section 25 extending transversely from the main part of the pin. The leading edges 26 of the widened section 25 are slanted toward the rear end 16. The outside edges 27 of the widened section 25 extend downwardly with respect to the main portion of the pin 13 in curved relationship thereto. A hole or elongated slot 30 extends longitudinally of the pin 13 substantially throughout the length of the widened section 25.

The second unit 12 of the fishhook and bait holder device 10 of this invention includes a flat, rigid pin structure 32 which is somewhat shorter than the pin 13. The front or top end 33 is pointed and has a hole 34 extending therethrough. The rear or bottom end 35 has a hole 36 therethrough receiving a ring 37 upon which is loosely wrapped a hanger wire 38 having triple-pointed fishhooks 39 and 40 hanging from opposite ends providing a hook assembly 41 similar to hook assembly 18.

The device is used in the following manner. The pointed end 14 of the pin 13 is inserted into the mouth of a bait fish 45, for example a smelt, so that the point extends through and pierces the side of the fish near the tail 46 to expose the hole 15. This may be accomplished by bending the tail 46 sideways until the point 14 protrudes from the fish. A two-pointed, U-shaped fishhook 48 having a bight section 49 is then inserted through the hole 15. A fishhook assembly 18 extends from the mouth of the fish, as illustrated in FIGURE 2, and assists the hook 48 in retaining the pin 13 in the fish.

The pin 32 is inserted upwardly through the belly of the fish 45 so that the pointed end 33 passes through the slot 30 in the pin 13 and protrudes from the top of the fish. The downwardly extending edges 27 of the widened section 25 of pin 13 aid in guiding the pointed end 33 of the pin 32 into the slot 30 as the pin 13 is pushed upwardly. A leader 50 is then connected to the pin 33 by extending the hook fastener 51 through the hole 34. The hook assembly 41 dangles from the bottom of the fish as illustrated in FIGURE 2, and cooperates with the fastener 51 to hold the pin 32 in the fish 45. The hole 30 could be placed in pin 32 is desired. A line 52 is attached to the leader 50 in the usual manner and a bobber can be fixed on the line at the desired point.

The fishhook and bait holder device 10 of this invention is used primarily for still fishing. When the device 10 is dropped over the side of a boat, the bait fish 45 will be held in a natural, generally horizontal position. The second unit 12 tends to keep the bait 45 stabilized so that the bait appears to be suspended in the water. The elements are proportioned so as to be substantially balanced and so as not to cause the bait to float tail-down as with conventional devices.

This invention contemplates the use of frozen fish as bait. It is illegal to use certain kinds of live fish as bait in some jurisdictions. For example, live smelt and various other fish cannot be used as bait in some inland waters because of the possibility of the inadvertent infestation of the waters with these fish. Normally, these fish can be used as bait if they are dead, but it is not usually desirable to keep dead fish under any circumstances for an appreciable time without taking some precautionary steps to prevent decay. Smelt and other bait fish can be frozen in the ordinary manner that foods are frozen to be preserved and the bait fish can be kept in this condition for an extended time until they are to be used as bait. Bait fish can be stored, transported and marketed while frozen and, accordingly, can be made readily available to fishermen.

It has been found, however, than when frozen fish are used as bait, certain novel problems are created. The flesh of frozen fish normally is rigid and stiff; yet, when the flesh thaws, it is limp. This requires special equipment to handle the frozen fish as bait. The fishhook and bait holder device of this invention is entirely satisfactory for using frozen fish as bait. The pins 13 and 32 are to be made strong enough to be pushed through the stiff flesh of frozen fish; yet, the elongated pin 13 together with the shorter pin 32 keeps the fish in its normal life-like shape after it has thawed.

The device 10 of this invention has several additional advantages over conventional devices. It can be made of rigid metal portions so that it will last a long time. It can be manufactured quite economically. A large number of well dispersed hooks can be applied to the two pins making the device considerably more effective than many conventional devices. Bait can be applied to a line very simply, and can be removed with little effort. This is a very distinct advantage since many conventional devices employ the use of fishhooks or wires with bars to hold the bait. The two units 11 and 12 cannot be inadvertently disconnected, because one extends through the other. Removing the hooks of the device 10 from a game fish after it has been landed is considerably more easy than with conventional devices. For example, the two units 11 and 12 can be separated simply by loosening the fastener 51 and pulling the pin 32 out of the fish and pulling the pin 13 longitudinally out of the mouth of the fish. This enhances the subsequent removal of the fishhook assemblies. Conventional type devices cannot be disconnected in such a simple manner and the freeing of a caught fish from the bait in some cases is extremely difficult. For the most part, the entire device 10 is inside the bait fish with little or no artificial materials exposed except the hook assemblies and, of course, the leader 50. This considerably increases the effectiveness of the device.

While certain embodiments and details of the invention have been shown, it will be appreciated by those skilled in the art that various changes and modifications may be made without departing from the spirit or scope of the invention.

I claim:

1. A natural bait holder for holding bait fish such as smelt or the like while still fishing, said holder comprising a first rigid, elongated pin having a sharpened end for insertion through the bait fish in a longitudinal direction, a second rigid, elongated pin for insertion through the bait fish in an upright transverse direction, one of said pins having a hole through an intermediate portion thereof receiving the other pin at a point adjacent the center of gravity of the bait fish, said second pin having upper and lower ends, said upper end including a sharpened portion, hook means connected to at least one end of said first pin and to said lower end of said second pin, and said upper end of said second pin including aperture means for receiving fish line connection means whereby said second pin is retained in the bait fish and the bait fish is supported above its center of gravity in a horizontal position while still fishing.

2. A natural bait holder according to claim 1 wherein said sharpened end is positioned on the forward end of said first pin for insertion through the mouth of the bait fish toward the tail thereof, and said hook means are connected on both ends of said first pin.

References Cited by the Examiner

UNITED STATES PATENTS

| 112,129 | 2/1871 | Davis | 99—195 |
|---|---|---|---|
| 742,293 | 10/1903 | Curtis et al. | 99—3 |
| 1,950,075 | 3/1934 | Akerson | 43—42.49 X |
| 2,565,956 | 8/1951 | Duhamel | 43—44.4 |
| 2,880,545 | 4/1959 | Stadler | 43—44.2 X |

SAMUEL KOREN, *Primary Examiner.*

ALDRICH F. MEDBERY, *Examiner.*

D. J. LEACH, *Assistant Examiner.*